Figure 1:
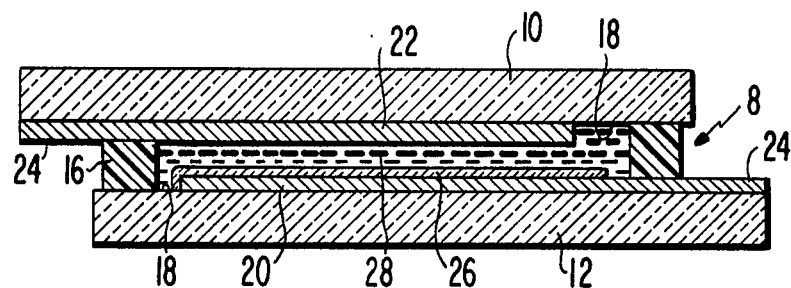

United States Patent [19]
Hanak et al.

[11] 4,042,293
[45] Aug. 16, 1977

[54] LIQUID CRYSTAL DEVICES HAVING DIODE CHARACTERISTICS

[75] Inventors: Joseph John Hanak, Princeton; Ronald Norman Friel, Hamilton Square; Lawrence Alan Goodman, East Windsor, all of N.J.

[73] Assignee: RCA Corporation, New York, N.Y.

[21] Appl. No.: 595,836

[22] Filed: July 14, 1975

Related U.S. Application Data
[63] Continuation of Ser. No. 430,595.

[51] Int. Cl.² .................................................. G02F 1/13
[52] U.S. Cl. .................................. 350/160 LC; 428/1
[58] Field of Search ....................... 350/160 LC; 428/1

[56] References Cited
U.S. PATENT DOCUMENTS

| | | | |
|---|---|---|---|
| 3,499,112 | 3/1970 | Heilmeier | 350/160 LC |
| 3,663,086 | 5/1972 | Assouline et al. | 350/150 |
| 3,730,607 | 5/1973 | Grabmaier et al. | 350/160 LC |
| 3,809,456 | 5/1974 | Goldmacher et al. | 350/160 LC |

*Primary Examiner*—Edward S. Bauer
*Attorney, Agent, or Firm*—Glenn H. Bruestle; Birgit E. Morris

[57] ABSTRACT

The device comprises an enclosure including two spaced apart electrodes for applying an electric field through a film of liquid crystal material between the electrodes. Disposed on one of the electrodes, between it and the liquid crystal film, is a semiconductor material layer. The semiconductor layer has a rectifying or non-ohmic contact with the liquid crystal film, and has an ohmic or low resistance contact with the electrode. The layer has a resistance, when the rectifying contact is reverse biased, greater than that of the liquid crystal film, and, when the rectifying contact is forward biased, less than that of the film.

3 Claims, 2 Drawing Figures

VOLTAGE-CURRENT CURVE FOR VOLTAGES
ON ELECTRODE 22 RELATIVE TO ELECTRODE 20

LIQUID CRYSTAL DEVICES HAVING DIODE CHARACTERISTICS

This is a continuation of application Ser. No. 430,595, filed Jan. 3, 1975, now abandoned.

This invention relates to liquid crystal devices, and particularly to a liquid crystal device having diode characteristics.

Liquid crystal devices, comprising a liquid crystal material sandwiched between a pair of substrates, are well known. Normally, electrodes are provided on the inside surfaces of the substrates in contact with the liquid crystal material, and electrical signals are applied to the electrodes to activate the liquid crystal material to alter the light transmission characteristics thereof. Such devices are normally electrically symmetrical, i.e., the device electrical characteristics are substantially the same regardless of the polarity of the voltages applied thereacross.

One variation of such devices utilizes a layer of a photoconductive material, e.g., zinc sulfide, disposed between one of the device electrodes and the liquid crystal material. When not illuminated with a light which creates free charge carriers in the photoconductive material, e.g., ultraviolet light, the resistance of the photoconductive layer is substantially higher than that of the liquid crystal material, and substantially all the voltage applied across the device is dropped across the photoconductive layer. Thus, the liquid crystal material is not activated. Conversely, when the photoconductive layer is illuminated with a charge carrier inducing light, the resistance thereof significantly decreases, and the applied voltage is available to the liquid crystal material to activate it. Except for the variations in resistance of the device which depend upon illumination thereof, such liquid crystal-photoconductive layer type devices are also substantially electrically symmetrical.

IN THE DRAWINGS

Figure 2:
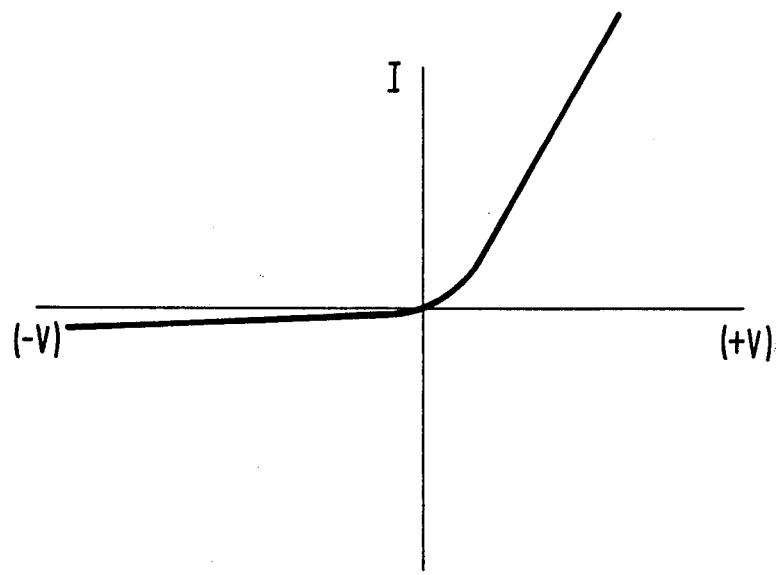

FIG. 1 is a view, in cross-section, of a liquid crystal device made in accordance with the instant invention; and FIG. 2 is a graph showing the voltage and current characteristics of the device shown in FIG. 1 for opposite polarity voltages applied thereto.

Structurally, the liquid crystal device 8 shown in FIG. 1 is quite similar to known liquid crystal devices incorporating a photoconductive layer. Thus, for example, the device 8 comprises two substrates 10 and 12, e.g., of transparent glass, maintained in oppositely disposed, spaced apart relation by means of spacer members or shims (not shown) of, for example, mica, and a seal 16, e.g., of glass, disposed about the edges of the substrates 10 and 12. Disposed on the inside surface 18 of each substrate 10 and 12 is an electrode 20 and 22, respectively, of a conductive material, e.g., aluminum, tin oxide, or the like, normally used in such liquid crystal devices. Either or both electrodes 20 and 22 can be continuous, or, if the device is to be used as an optical display, as hereinafter described, either or both electrodes can be patterned in the shape of an image to be displayed, or patterned in the form of a matrix of orthogonal conductors, such as those shown in U.S. Pat. No. 3,222,485, issued May 30, 1967 to Williams. Connecting means 24, preferably of the same material as the electrodes 20 and 22, are connected to each electrode and extend along the substrate inside surfaces to exposed edge portions of the substrates where known terminal means, not shown, can be connected to the connecting means 24 for applying a voltage between the electrodes 20 and 22.

Covering the electrode 20 on the substrate 12 is a layer 26 of a semiconductor material. Although not critical, the layer 26, for reasons described hereinafter, is preferably transparent, has a thickness in the order of 1 micrometer, has a relatively low bulk resistivity, when in thermal equilibrium, in the order of $10^6$ ohm-cm or less, and is relatively insensitive to visible light. Numerous semiconductor materials, such as zinc oxide, zinc sulfide, and the like can be used.

A film 28 of a liquid crystal material of the type normally used in liquid crystal display devices is disposed between the substrates in contact with the electrode 22 and the layer 26 of semiconductor material.

Devices in accordance with the instant invention exhibit diode or rectifying characteristics. Thus, as shown in FIG. 2, with no illumination on the device, and with a semiconductor layer 26 of N type conductivity, the resistance of the device 8 when the electrode 22 is positive with respect to the electrode 20 is substantially less than the resistance of the device when the polarity of the applied voltage is reversed, i.e., with the electrode 22 negative with respect to the electrode 20. If the device is illuminated, additional charge carriers are produced within the semiconductor layer 26 which increase the current in the lower conductivity mode of operation while having little effect on the higher conductivity mode of operation owing to the already high level of charge carriers present.

If the semiconductor layer 26 is of P type conductivity, the same type of assymetrical characteristics result, but with opposite applied voltage polarity.

While not known for certain, it is believed that devices in accordance with the instant invention are electrically similar to a known type of semiconductor diode known as a "barrier layer" diode comprising a semiconductor body disposed between two contacts, one of which is an ohmic or low resistance contact, and the other of which is a non-ohmic or rectifying contact. At the rectifying contact there exists a potential (i.e., electric potential) barrier to electron flow, the magnitude or the effectiveness of the barrier being dependent upon the polarity of voltage applied across the barrier region. Stated differently, the energy of activation required for majority carrier current flow across the barrier in one direction is much lower than the energy of activation required for current flow across the barrier in the opposite direction. Consequently, the current amplitude is quite asymmetric with voltage.

In devices according to the instant invention, it is believed that the liquid crystal material serves somewhat the same function as the non-ohmic electrode of the barrier diode, and there thus exists in the semiconductor layer, at the interface thereof with the liquid crystal material film 28, a potential barrier which is voltage polarity dependent with respect to current flow across the barrier.

The requirements for providing such a rectifying contact to a semiconductor material are generally known. Thus, for example, the resistivity of the semiconductor material at the contact should not be too low, preferably being, for example, in the order of or in excess of 1-10 ohm-cm.

Additionally, in order to give rise to the barrier region within the semiconductor material at the surface thereof, majority carriers from the semiconductor material must be transferred from the bulk of the semiconductor material to the interface region between the semiconductor and the contact material. With a liquid crystal material contact, it is believed that this is accomplished if the energy levels of the dopants used in the liquid crystal material are either higher or lower than the Fermi level of the semiconductor material dependent upon the conductivity tape thereof. In N type semiconductor materials, for example, the energy levels of the liquid crystal ionic dopants in their oxidants state must be lower than the Fermi level of the semiconductor material. Thus, electrons will transfer from the semiconductor material to these dopants, with no applied field, and thus create the barrier layer within the semiconductor material. Conversely, with P type semiconductor materials, the energy levels of the liquid crystal material dopants must be higher than the Fermi level of the semiconductor materials.

For example, using N type semiconductor materials having a Fermi level in the order of 4–5 electron volts, various liquids crystal materials containing the bromide dopant, in the form, for example, hexadecylpyridiniumbromide

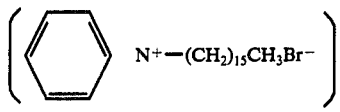

can be used.

In liquid crystal materials, dopants are used for various functions, e.g., to control the conductivity of the liquid crystal material. Various liquid crystal materials and dopants are known. The energy levels of any particular dopant are of dependent, however, on the particular solvent or liquid crystal material in which it is disposed, and must be determined by experimentation using known procedures. In general, however, the relative energy levels of various dopants can be approximated from certain thermodynamic data, such as the oxidation potentials for the dopants in a particular solvent, e.g., water. That is, although the particular energy levels will likely differ from solvent to solvent, the relative levels of various dopants with respect to one another will be the same from solvent to solvent.

Additionally, barrier diodes, as above-noted, include an ohmic or non-rectifying contact. In devices of the instant invention, such ohmic contacts are provided by the electrodes 20. Techniques for providing ohmic contacts to semiconductor materials are generally known, the general requirements being that the electrodes have a low resistinvity, in the order of or less than $10^{-1}$ or $10^{-2}$ ohm-cm., and that the electrodes form a low resistance contact with the semiconductor material. Such low resistance contacts can be provided, for example, by using electrode materials whose work function is less than that of the semiconductor material. Additionally, or alternatively, by depositing the semiconductor material on the electrodes by certain processes e.g. sputtering, evaporation, or chemical vapor deposition, the semiconductor material is doped by the electrode material to a high level of conductivity at the electrode contact. In a preferred embodiment, for example, zinc oxide is sputtered onto the electrodes using a known RF sputtering process.

Further details of this sputtering process are described hereinafter. Of importance, however, is that such process results in the layer 26 having a bulk resistivity, when in thermal equilibrium, in the order of $10^4$ ohm-cm, as measured using coplanar electrodes.

As previously noted, such a low bulk resistivity is preferred. A reason for this is as follows.

Semiconductor theory suggests that a high concentration of free carriers in the semiconductor material under forward biased conditions can be obtained even for high bulk resistivity semiconductor material provided that the semiconductor material is sufficiently trap-free and is sufficiently thin to enable injection of majority carriers entirely through the semiconductor material from contact to contact. That is, according to such theory, devices in accordance with the instant invention, having asymmetrical electrical characteristics, can be provided using high bulk resistivity semiconductor material having a layer thickness in the order of 1 micrometer.

As a practical matter, however, sufficiently trap-free high bulk resistivity semiconductor material is quite difficult to obtain, and in order to provide high conductivity characteristics in the forward biased condition, it is most convenient to use semiconductor material having relatively low bulk resistivity, e.g., less than $10^6$ ohm-cm. In this latter case, the ohmic contact supplies all the majority carriers that are required by the semiconductor.

As previously noted, prior art liquid crystal devices incorporate a photoconductive layer between the electrodes on a substrate and the liquid crystal material. The photoconductive materials of the prior art devices are semiconductor materials, some of which could be used in accordance with the instant invention. A significant difference between devices made in accordance with the instant invention and devices made according to the prior art, however, is that while devices of the instant invention exhibit diode characteristics, as shown in FIG. 2, the prior art devices are substantially electrically symmetrical.

Additionally, in prior art devices, activation of the liquid crystal material film is achieved by illuminating the device with a light which induces charge carriers in the photoconductive material layer, thus significantly reducing the resistance thereof and making $\mp$available" the applied voltage for activating the liquid crystal film. In devices of the instant invention, according to a preferred embodiment, activation of the liquid crystal material film is not dependent upon light illumination but upon the polarity of the voltage applied thereacross. This is described below.

From a structural consideration, while devices of the instant invention resemble barrier diodes, including a semiconductor layer disposed between an ohmic and a non-ohmic contact, it appears that the prior art devices do not. For one thing, as noted, the prior art devices do not exhibit diode characteristics, or at least exhibit these characteristics to such a minor extent as not to have been heretofore recognized and reported. While not known for certain, it is thought that one possible reason for the absence of such diode characteristic in the prior art devices is that the contact between the photoconductive layer and the conductive electrodes is not of sufficient quality to provide a true ohmic contact as required in a barrier diode. Since the contact between the photoconductive layer and the liquid crystal material is also non-ohmic, the result is that the prior art devices comprises back-to-back barrier diodes. In such case, the effective resistance of the photoconductive layer is high for either polarity of voltage applied across the device.

Additionally, in the prior art devices, photoconductive materials are used which have a high bulk resistance, when in thermal equilibrium, in order that, in the absence of illumination, the applied voltage is dropped largely across the photoconductive layer rather than across the liquid crystal material layer. Moreover, base upon descriptions of such devices appearing in the literature, it appears very likely that the photoconductive material used contains many traps, whereby the likelihood of obtaining large carrier concentrations by injection through the photoconductive layer is very small. Thus, again, the effective resistance of the photoconductive layer is high for either polarity of applied voltage.

By virtue of the face that the combination of the semiconductor layer 26 and its associated contacts has a resistance which is less than that of the liquid crystal film 28 when the device 8 is forward biased, but which is greater than that of the liquid crystal film when the device is reverse biased, the device 8 can be used as an otherwise conventional liquid crystal display having a diode switch integrated therewith. Thus, when the device is reverse biased, with the layer 26 having a sufficiently larger resistance than the liquid crystal film 28, most of the applied voltage is dropped across the layer 26 and the liquid crystal film is not activated. Conversely, under forward bias conditions, with the layer 26 having a sufficiently smaller resistance than the liquid crystal film 28, the applied voltage is available to activate the liquid crystal film. Thus, depending upon the polarity of the voltage applied across the device, the liquid crystal material is or is not activated, and, using known control circuits, the device can be selectively activated to provide an optical display.

The desired relative voltage drops of the semiconductor layer 26 and the liquid crystal material film 28 for complete activation or deactivation of the liquid crystal material are dependent upon the threshold characteristics of the liquid crystal material, i.e., upon the voltage range over which switching of the liquid crystal material from one state to the other occurs. For liquid crystal materials operating in the dynamic scattering mode of operation, for example, a sharp threshold is generally not present, and a large change in the resistance of the semiconductor layer 26 relative to that of the liquid crystal layer 28 is preferred. For example, with a layer 28 having a resistance of $10^8$ ohms, it is preferred that the resistance of the layer 26 be in the order of $10^7$ ohms or less in the forward biased condition, and in the order of $10^9$ ohms or greater in the reverse biased condition.

As above noted, any of a number of different semiconductor materials can be used in devices according to the instant invention. The magnitude of the observed rectifying effect does appear to vary with the material used, however, and it presently appears that the greatest effects are obtainable using a semiconductor layer of zinc oxide.

Also, if the device is to be used as a display activated solely by electrical means, it is preferably to use semiconductor materials which are relatively insensitive to visible light, i.e., semiconductor materials having a band gap energy of 2.5 electron volts or more. In such case, provided the device is not illuminated with short wavelength radiations, the visible light used to illuminate the device does not generate such large numbers of free charge carriers as to destroy the asymmetrical characteristics of the device.

Conversely, of course, devices can be made which are addressable both electrically and optically.

Generally speaking, in the use of devices according to the instant invention as a liquid crystal display, the liquid crystal material is selected depending upon its particular suitability for the intended application. For example, in a battery operated liquid crystal device, such as a wrist watch, low current drain and thus high resistivity liquid crystal materials are generally preferred. Having selected the liquid crystal material, the particular semiconductor layer 26 and the electrode in contact with the semiconductor are selected to match the selected liquid crystal material.

Owing to the layered nature of the device 8, capacitive characteristics are present which give rise to capacitive currents if the device is addressed with a.c. voltages. Such capacitive currents are not voltage polarity dependent, and the greater the ratio of the barrier layer capacitance to the capacitance of the liquid crystal film, and the higher the frequency of the applied voltage, the more symmetrical are the device characteristics. Thus, while devices according to the instant invention can be operated with a.c. voltages, the devices are most practically operated using d.c. voltages.

As above-noted, in a preferred embodiment, a semiconductor layer comprises zinc oxide provided by a sputtering process. In general, a known R-F process can be used. A description of such suitable processes is given, for example, in an article, "R-F Sputtering Process," by J. L. Vossen and J. J. O'Neill, Jr., in the RCA Review, June, 1968.

More specifically, the zinc oxide layer can be provided by R-F sputtering a disk target of zinc metal, the target being disposed parallel to and about 6 cm. distant from the substrate being coated in an atmosphere consisting of a mixture of about 80% argon and 20% oxygen at a pressure of 10 to 20 milliters, preferably 15 milliters. The atoms of zinc, sputtered from the target by positive ions of argon and oxygen, react chemically with the oxygen of the sputtering atmosphere to form zinc oxide, which is deposited on the substrate. The bulk resistivity of the deposited zinc oxide layer, it is found, is dependent on the composition of the gas atmosphere. For example, relatively low resistivity layers are obtained, preferred, as above-described, using gas atmospheres containing less than 20% of oxygen by volume. Conversely, gas atmospheres containing substantially greater than 20% of oxygen result in deposited layers of higher bulk resistivity.

Additionally, it is found that more smooth surfaces, preferably for optical performance, are obtained by maintaining the substrate at relatively low temperatures, e.g., between 20° and 60° C during the deposition process. This is done, for example, by passing cooling water through a metal tubing connected to a metal substrate holder.

What is claimed is:

1. The method of operating a liquid crystal device of the type comprising a pair of spaced apart electrodes, a liquid crystal between said electrodes, and a semiconductor material disposed between and in contact with one of said electrodes and said liquid crystal material, the contact between said semiconductor material and said one of said electrodes being ohmic and the contact between said semiconductor material and said liquid crystal material being non-ohmic, The resistance associated with said semiconductor material being greater or less than that of said liquid crystal material depending upon the polarity of voltage applied between said electrodes, said method comprising selectively activating and deactivating said liquid crystal material by selectively applying one or the opposite polarity voltages between said electrodes.

2. The method of operating a liquid crystal device as in claim 1 including using a liquid crystal device wherein the resistance associated with said semiconductor material varies with the polarity of voltage applied between said electrodes by a factor of about $10^2$ or greater.

3. The method as in claim 2 wherein said semiconductor material comprises zinc oxide.

* * * * *

UNITED STATES PATENT OFFICE
CERTIFICATE OF CORRECTION

PATENT NO. : 4,042,293

DATED : August 16, 1977

INVENTOR(S) : Joseph John Hanak et al

It is certified that error appears in the above-identified patent and that said Letters Patent are hereby corrected as shown below:

Column 1, line 6 should read: -- filed Jan. 3, 1974, now abandoned.--

Signed and Sealed this

Twenty-seventh Day of December 1977

[SEAL]

Attest:

RUTH C. MASON
*Attesting Officer*

LUTRELLE F. PARKER
*Acting Commissioner of Patents and Trademarks*